United States Patent [19]

Maltezos

[11] Patent Number: 5,014,301

[45] Date of Patent: May 7, 1991

[54] INTERNATIONAL SPEAKER TELEPHONE

[76] Inventor: Alexander Maltezos, 909 Third Ave., New York, N.Y. 10022-0544

[21] Appl. No.: 306,797

[22] Filed: Mar. 10, 1989

[51] Int. Cl.$^5$ ............................................. H04M 17/00
[52] U.S. Cl. ..................................... 379/155; 379/88; 379/143
[58] Field of Search ............... 379/146, 147, 148, 149, 379/150, 151, 67, 263, 262, 264, 265, 266, 309, 308, 88, 155, 144, 143

[56] References Cited

U.S. PATENT DOCUMENTS

| 4,031,324 | 6/1977 | Dudonis | 379/148 |
| 4,736,405 | 4/1988 | Akiyama | 379/211 X |

FOREIGN PATENT DOCUMENTS

| 1162336 | 2/1984 | Canada | 364/412 |
| 88/05238 | 7/1988 | World Int. Prop. O. | 379/214 |

OTHER PUBLICATIONS

H. P. Klausen, "Coin-Box Telephone", Ericsson Review, No. 2, 1983.

Primary Examiner—James L. Dwyer

[57] ABSTRACT

The invention enhances a payphone by providing multilingual instructions to the user on how to complete a phone call. This is accomplished by providing a language directory listing at the payphone. Upon actuating the proper code for the language desired on the dial of the payphone, instructions will be given in that language.

1 Claim, 1 Drawing Sheet

INTERNATIONAL SPEAKER TELEPHONE

FIELD OF THE INVENTION

This invention relates to providing instructions to customers using pay stations such as coin telephones.

BACKGROUND OF THE INVENTION

Improvements in the field of payphones during the last decade and the break up of the monopoly by the common carriers and utilities of the telephone industry have increased, and resulted in better customer service, including more economical service.

Today payphones are using spoken words to instruct the caller how to make and complete a call. At this time we are using approximately 46 phrases to instruct and assist the caller in making his call.

Today, "Smart Payphones" are using digital voice microchips to give the caller a set of instructions; such as, "deposit 25 cents, thank you", in English language only. These sets of instructions are coming from among the payphone itself, the central office, or a live operator.

In places such as airports, the public is made up of many nationalities requiring at times instructions in their native language. The prior art does not provide this multilingual service at the payphone itself.

SUMMARY OF THE INVENTION

My invention is comprised of an improvement wherein not only English language instructions are available but multilingual instructions on a selective basis using the keypad or dial input are possible.

DETAILED DESCRIPTION

Figure 1:
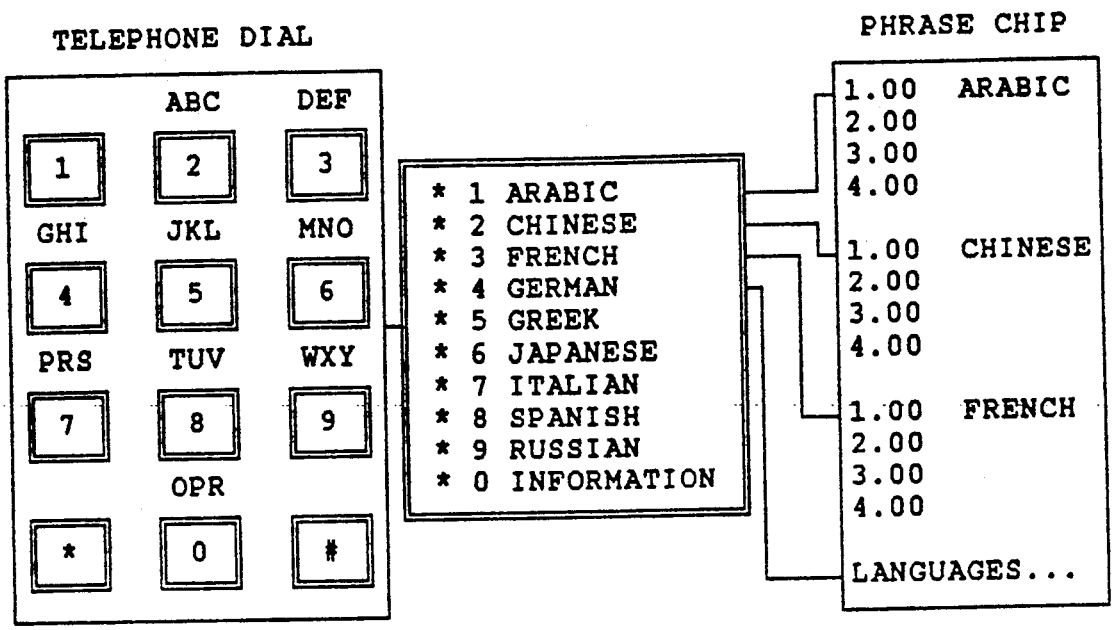
FIG. 1 illustrates in block diagram the manner in which a payphone is altered to add the embodiment of the invention.

FIG. 1 illustrates in block diagram the telephone dial with the conventional numerals and signs: 1, 2, 3, 4, 5, 6, 7, 8, 9, 0, *, #. Along side the keypad or dial is a directory listing of a host of languages and a corresponding numeral (such numerals fund in the keypad) representing a number code which when dialed in a sequence discussed below will enable the voice device within the telephone to provide instructional aid.

The voice will be in the language selected by the user. A customer would operate the payphone by first depressing the (*) asterisk key followed by the appropriate coded numeral which reflects the language desired. This would activate the voice chip to provide instructional aid in using the payphone in the appropriate language. Upon completing of the call the user would depress the pound button (#) which will disconnect the call and reset the payphone voice chip to the language of prominence in the region; such as English as shown.

Figure 2:
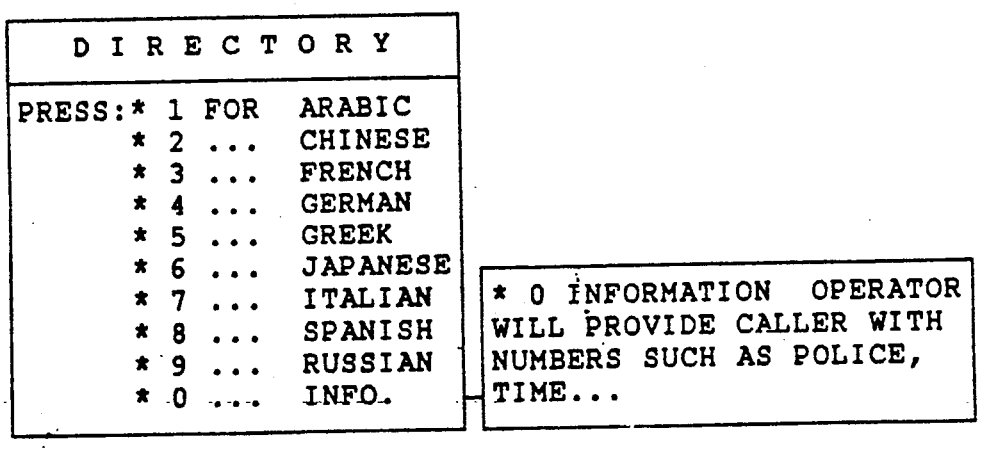
FIG. 2 illustrates the directory listing and store of information for a host of languages.

FIG. 2 illustrates the directory listing, shown as an example, that would be next to the keypad. This would allow a user to make the appropriate selection of the language of choice.

I claim:

1. A payphone which includes a keypad or dial and a digital voice device for providing a user of said payphone voice instructions as to the operation of said payphone; the improvement comprising:
   a directory listing next to said keypad or dial including a list of languages with a corresponding coded numeral found on said keypad or dial; and
   said digital voice device further comprising multilingual voice instructions selectively controlled by the actuation of said keypad or dial such that the numeral actuated on said keypad provides instructions in the language which corresponds in said directory listing.

* * * * *

UNITED STATES PATENT AND TRADEMARK OFFICE
CERTIFICATE OF CORRECTION

PATENT NO. : 5,014,301

DATED : May 7, 1991

INVENTOR(S) : Alexander Maltezos

It is certified that error appears in the above-identified patent and that said Letters Patent is hereby corrected as shown below:

On the title page, item [54], line 1 and in column 1, line 1, in the title please change "INTERNATIONAL SPEAKER TELEPHONE" to read --INTERNATIONAL SPEAKING TELEPHONE--.

Signed and Sealed this

Twenty-fifth Day of August, 1992

Attest:

DOUGLAS B. COMER

*Attesting Officer*  *Acting Commissioner of Patents and Trademarks*